United States Patent

[11] 3,590,957

| [72] | Inventors | Mahlon E. Campbell<br>Merriam;<br>Vernice Hopkins, Overland Park; Roger J.<br>Schroeder, Overland Park, all of, Kans. |
|---|---|---|
| [21] | Appl. No. | 778,553 |
| [22] | Filed | Nov. 25, 1968 |
| [45] | Patented | July 6, 1971 |
| [73] | Assignee | Midwest Research Institute<br>Kansas City, Mo. |

[54] DISTRIBUTION OF SOLID LUBRICANTS HAVING FUSIBLE BINDERS
9 Claims, 10 Drawing Figs.

[52] U.S. Cl. ................................................ 184/99,
184/1, 308/240
[51] Int. Cl. ............................................... F16n 15/00
[50] Field of Search .......................................... 184/98, 99,
1 E; 308/95, 78, 240

[56] References Cited
UNITED STATES PATENTS

| 2,852,097 | 9/1958 | Proctor .......................... | 184/(1 UX) |
| 3,483,949 | 12/1969 | Liccardi et al. ................. | 184/1 |
| 694,609 | 3/1902 | Brown .......................... | 184/98 |
| 703,974 | 7/1902 | Swan ............................ | 308/240 X |
| 1,936,894 | 11/1933 | Whiteley ....................... | 308/240 |
| 2,686,155 | 8/1954 | Willis ........................... | 184/(99 UX) |
| 2,980,475 | 4/1961 | Wolfe ........................... | 308/240 |
| 3,206,264 | 9/1965 | Dalzell et al. .................. | 308/240 |

Primary Examiner—Manuel A. Antonakas
Attorney—Schmidt, Johnson, Hovey & Williams ABSTRACT: A solid lubricant having a low fusion temperature binder is applied to the wear surface of a machine element by transferring the lubricant from a reservoir disposed such that the lubricant is in heat exchange relationship with the element. The melting temperature of the lubricant binder is greater than the normal operating temperature of the element, thus melting of the binder and attendant transfer of the lubricant, such as by flow thereof in the melted state, occurs when the element develops excessive heat due to lubrication depletion. Depending on the melting temperature of the binder, the solid lubricant may be employed for primary lubrication or utilized as a backup lubricant which is distributed on the wear surface in the event of depletion of the primary lubricant.

PATENTED JUL 6 1971 3,590,957

INVENTORS.
Mahlon E. Campbell
Vernice Hopkins
Roger J. Schroeder

BY Schmidt, Johnson, Hovey,
Williams & Bradley
ATTORNEY

DISTRIBUTION OF SOLID LUBRICANTS HAVING FUSIBLE BINDERS

Thin film solid lubricants provide low friction between moving mating parts and maintain lubricity over a range of temperature. Therefore, solid lubricants enjoy widespread use in many applications, but suffer from the disadvantages that application thereof to the parts requiring lubrication necessitates that the parts be coated with the lubricant prior to assembly, and the finite wear life is inherently limited by the quantity of the applied film. This, of course, is in contrast to liquid lubricants such as petroleum which are readily applied to various machine elements (such as bearings or the like) during or after assembly thereof and which may be reapplied upon depletion.

A prior approach dealing with the above problems is to employ a solid lubricant composite material in the fabrication of one or more of the parts of a machine unit requiring lubrication, an example being the bearing retainer of a ball bearing assembly. However, difficulties of reinforcement and in maintaining the structural strength of the lubricant composite part are encountered since the part would otherwise be of a metallic composition or other substance having inherent structural strength. Furthermore, the wear against the lubricant composite necessary for transfer of the film lubricant may limit the life of the unit. Referring again to ball bearing retainers as an example, the ball pocket of the lubricant composite retainer becomes oversize as the lubricant is consumed, thereby limiting the life of the bearing assembly.

It is, therefore, an important object of the present invention to provide a method of applying a solid lubricant to the wear surface of a machine element, wherein coating of the surface and bonding of the lubricant thereto before assembly are eliminated and the wear life of the element is increased while maintaining the advantageous lubricating qualities of the solid lubricant.

As a corollary to the foregoing object, it is an important aim of this invention to provide means which prevents any substantial reduction in the structural strength of the machine unit into which such lubricant is introduced.

Furthermore, it is an important object of this invention to provide a method of utilizing solid lubricants for backup lubrication in the event of depletion of the primary lubricant normally relied upon for lubrication of a machine element.

Additionally, it is an important object of the invention to provide a structural arrangement and a method whereby, through proper selection of the binder of a solid lubricant in accordance with its melting temperature, the lubricant may be employed for either a primary or a backup lubrication function depending upon the requirements of particular applications.

In the drawing:

FIG. 1 is a cross-sectional view of a shaft in a sleeve bearing, lubrication thereof being effected in accordance with the teachings of the present invention;

FIG. 2. is a fragmentary, perspective view on a reduced scale of the shaft of FIG. 1;

Figure 10:
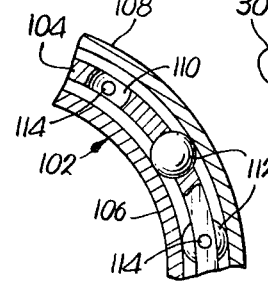
Figure 9:
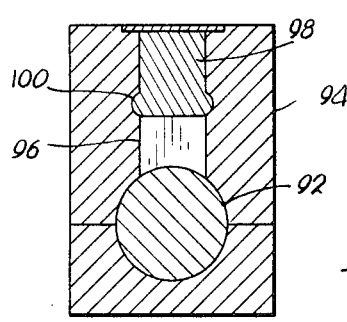

FIG. 9 is a cross-sectional view of a shaft and bearing block showing a reservoir for backup lubricant arranged to effect transfer of the lubricant to the shaft by mechanical rubbing in conjunction with attainment of a given temperature; and FIG. 10 is a fragmentary, cross-sectional view of a ball bearing assembly taken in a plane orthogonal to the axis of the bearing and illustrating the plugs of solid lubricant carried by the bearing retainer.

The lubricant employed in the present invention may comprise a variety of thin film solid lubricants having low fusion temperature binders. A binder material of the organic type is suitable and may be selected from polyphenyl ethers, petroleum waxes and natural waxes. A lubricating pigment is dispersed in the selected binder and may comprise any of various lubricating solid powders, such as metal sulfides, graphite, metal selenides, metals, and lubricating plastics. Specific formulations will be set forth hereinbelow.

The solid lubricant (in its solidified state) is cast into a body that is contained within a reservoir, the latter being disposed with respect to a machine element under lubrication such that the solid lubricant is in heat exchange relationship with the element. Alternatively, employing a machine element of porous material, the solid lubricant (in its liquid state) may be impregnated into the element and permitted to resolidify. In either instance, a binder is selected which melts at a temperature higher than the normal operating temperature of the element. If it is desired that the lubricant be utilized as the primary lubricant for the element, the melting temperature of the binder would be chosen such that transfer of the lubricant from the reservoir to the wear surface of the element requiring lubrication would occur when the element develops excessive heat indicative of lubricant depletion, but short of temperatures which would cause damage to the structure. On the other hand, the lubricant may be employed to execute a backup lubricating function by selecting a binder having a sufficiently elevated fusion temperature to preclude melting of the lubricant unless the heat developed by the machine element is relatively high and indicative of a distress condition, which would be caused in this instance by depletion of the primary lubricant normally relied upon for lubrication.

Figure 1:
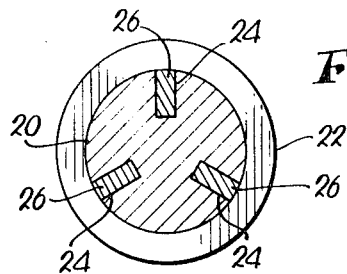
Figure 2:
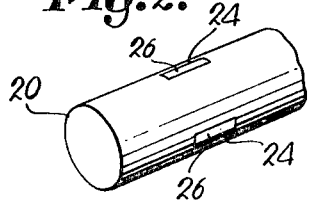

Referring to the drawing, FIGS. 1 and 2 are illustrative of the concept of the instant invention reduced to relatively simple structure. A shaft 20 turns in a sleeve bearing 22 and has three grooves 24 in its circumferential surface angularly spaced 120° apart. Each of the grooves is filled with a body of solid lubricant 26 having a melting temperature greater than the normal operating temperature of the shaft 20 attained upon rotation thereof within the sleeve 22.

If the lubricant 26 is to be employed as the primary lubricant for the mating surfaces of the shaft 20 and the sleeve 22, the unit is assembled without the application of any additional lubricant thereto and is permitted to run. As the shaft 20 begins to turn, the mating, initially unlubricated surfaces of the shaft 20 and the sleeve 22 develop excessive heat and cause the lubricant 26 to melt. Thus, by centrifugal force and the mechanical rubbing of the two surfaces, the lubricant 26 flows from the grooves 24 and is distributed over such mating surfaces to thereby cause the operating temperature of the unit to decrease. The distributed lubricant is now in the form of a thin film over the mating surfaces; therefore, as the operating temperature drops, the lubricant resolidifies and the film adheres to the inner surface of the sleeve 22. The lubricant is thus transferred from the grooves or reservoirs 24 to the wear surface of the sleeve 22. Transfer of additional lubricant to the wear surface is repeated as above when the film becomes depleted and the operating temperature of the unit increases once again. A flow from the grooves 24 of only the amount of the lubricant 26 therein needed to reform the film is assured since the grooves 24 extend radially inwardly of the shaft 20 so that melting of the lubricant 26 occurs primarily at the surface of each lubricant body remote from the axis of the shaft 20. It may be appreciated that the heat developed by the unit progresses radially inwardly from the mating surfaces of the shaft 20 and the sleeve 22; thus, since the metal shaft 20 is highly heat conductive, the bodies of lubricant 26 melt at the lubricant-metal interface and flow from the grooves 24 to relubricate the unit before the entire mass of each lubricant body is reduced to the liquid state.

In applications where the lubricant 26 is to be utilized to perform a backup lubrication function, a binder would normally be selected having a relatively high fusion temperature which, when reached, would also be indicative of a distress condition preceding ultimate failure of the unit. A suitable primary lubricant is employed in the usual manner with the backup lubricant being utilized only for the function of emergency relief in the event that the primary lubricant becomes depleted, such as by leakage from the unit or inadequate periodic relubrication in the case of petroleum lubricants. Once depletion of the primary lubricant occurs and the unit develops sufficient excessive heat to melt the secondary lubricant 26, transfer and distribution of the backup lubricant may occur in the same manner as discussed above. In some applications to be discussed hereinafter, the backup lubricant may remain in its liquid state and be employed only as a temporary lubricant for safety purposes. The fact that the backup lubricant has been called upon may be readily signaled by purposely loading the backup lubricant with an identifying color dye or an odorant, for example, to enable the presence of the backup lubricant to be detected.

Figure 3:
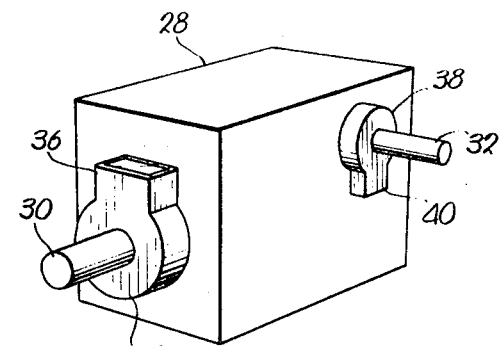
FIG. 3 is a simplified, perspective view of a gearbox or transmission illustrating the lubrication of the input and output shafts by gravity flow and surface tension lubricant transfer respectively.

FIG. 3 depicts a transmission 28 having an input shaft 30 and an output shaft 32. The input shaft 30 extends through a bearing housing 34 having a solid lubricant reservoir 36 disposed above the housing 34 and formed as an integral assembly. The output shaft 32 extends through a bearing housing 38 having a solid lubricant reservoir 40 therebeneath, also formed as an integral assembly in the housing 38. With respect to the use of a backup lubricant to execute a safety function, the significance of this aspect of the present invention may be appreciated when it is considered that a transmission such as illustrated at 28 could form part of the drive connecting the engine of a helicopter to the rotor thereof. Failure of transmission 28 or any of the other drive components due to loss of lubrication renders the drive train of a helicopter inoperable in a manner of seconds, and also freezes the rotor to prevent the windmilling action that could otherwise save the craft and its passengers. It may thus be appreciated that backup lubrication, in conjunction with a warning to the pilot that the drive train has reached an excessive heat condition, provides valuable additional seconds to bring the craft to a safe landing.

FIG. 3 is further illustrative of two of the five basic means by which the solid lubricant in the present invention may be transferred from a suitable reservoir to a wear surface requiring lubrication. These five means of transfer comprise gravity flow of the lubricant in its melted state, transfer by surface tension causing surface flow of the melted lubricant, capillary action or wicking action, flow by centrifugal force, flow by applying pressure to the lubricant as by pumping the latter to introduce the lubricant into a machine unit by injection, and transfer by mechanical rubbing of the wear surface against the lubricant in conjunction with the attainment of a given temperature. Both gravity flow and surface tension transfer are depicted in FIG. 3 and illustrated in detail in FIGS. 4 and 5 respectively.

Figure 4:
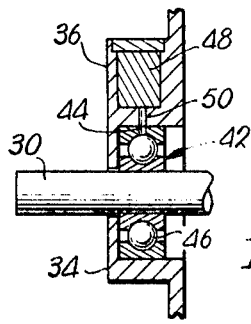
FIG. 4 is a cross-sectional view of a ball bearing assembly showing a rotatable shaft received therein and illustrating the lubricant transfer by gravity flow.

The shaft 30 in FIG. 4 is shown received by the inner race of a ball bearing assembly 42, the outer race thereof being received within housing 34 and provided with a radial port 44 which communicates with the annular space between the inner and outer races that contain the ball bearings 46. The reservoir 36 is filled with a body of solid lubricant 48 and has a passage 50 in the bottom thereof registering with the port 44. Being in close proximity to the bearing assembly 42, the lubricant 48 is responsive to the development of excessive heat by the bearing assembly 42 conducted to the lubricant 48 by the integral housing structure. Therefore, in either primary or backup lubrication applications, the lubricant 48 melts and flows to the ball bearings 46 through the passage 50 and port 44 when heat indicative of lubrication depletion is produced.

Figure 5:
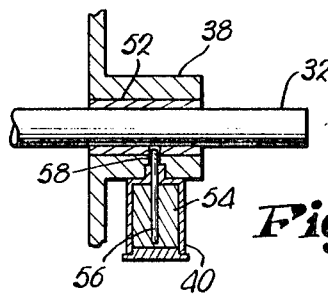
FIG. 5 is a cross-sectional view of a sleeve bearing receiving a shaft therewithin and illustrating lubricant transfer by capillary or wicking action.

In FIG. 5 the bearing housing 38 is shown containing a sleeve bearing 52 for the purpose of illustrating lubricant distribution by surface tension. The reservoir 40 contains a body of solid lubricant 54 which is cast around either a wick or a capillary tube diagrammatically illustrated at 56. The wick or tube 56 extends upwardly through the body of lubricant 54 and into aligned, radial ports 58 in housing 38 and sleeve 52. It may be appreciated that, as the lubricant 54 begins to melt in response to the development of excessive heat within the sleeve bearing 52, the melted lubricant will flow upwardly through the ports 58 and on to the mating surfaces of the shaft 32 and the sleeve 52.

With respect to the example shown in FIG. 5 of lubricant transfer by surface tension causing capillary action or wicking action, it should be understood that other forms of distribution by the action of surface tension may also be employed. A particularly advantageous configuration is to utilize a bushing composed of a porous metallic material and having an annular groove in its external surface. The groove is filled with a solid lubricant and thus flows radially inwardly through the porous material to the internal bore or wear surface of the bushing in response to the development of excessive heat within the bore.

Figure 6:
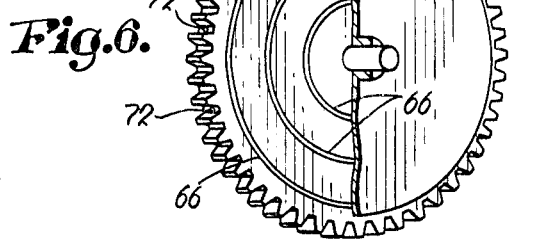
FIG. 6 is a perspective view of a gear and depicts the manner of lubricant transfer by centrifugal force.
Figure 7:
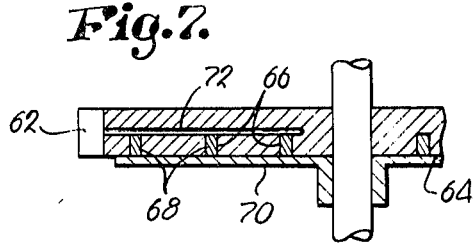
FIG. 7 is a partial cross section of the gear of FIG. 6.

An example of lubricant transfer by centrifugal force is shown in FIGS. 6 and 7. This configuration is principally for backup applications to prevent failure of transmissions or drive trains in the event of depletion of the primary lubricant. A toothed gear 60 is shown having the usual notches 62 between adjacent teeth thereof, the face 64 of the gear 60 having three concentric, circular grooves 66 therein filled with a solid lubricant 68. A cover plate 70 fits tightly against the face 64 and rotates with the gear 60.

A number of radially extending passageways 72 communicate corresponding notches 62 with the three rings of lubricant 68, as is particularly clear in FIG. 7. In order to control the release of the melted lubricant when excessive heat is developed at the teeth of the gear 60, the outer ring of lubricant 68 is preferably provided with a binder having a lower fusion temperature than the two inner rings of lubricant 68. The fusion temperatures may be progressively higher for the middle and innermost rings, thereby assuring that the melted lubricant will be gradually released for flow through the passageways 72 to the gear teeth as the heat is conducted by the body of the gear 60 radially inwardly toward its axis of rotation.

Figure 8:
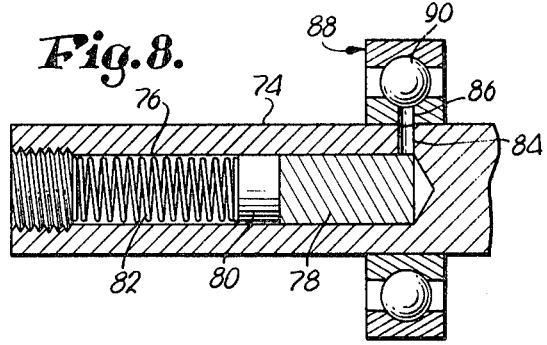
FIG. 8 is a cross-sectional view of a ball bearing assembly receiving a shaft therewithin shown in longitudinal section, and illustrates structure for effecting lubricant transfer by a pumping action.

FIG. 8 is an exemplary embodiment illustrating the use of a pumping action or applied pressure for lubricant transfer. A shaft 74 has a bore 76 extending axially thereof from one end of the shaft 74, a cast body of solid lubricant 78 being disposed at the end of the bore 76 remote from the end of the shaft 74. A piston 80 in the bore 76 engages the body of lubricant 78 under the bias of a spring 82. A radial passage 84 communicates with the inner end of the bore 76 and registers with a radial port 86 in the inner race of a ball bearing assembly 88. When the ball bearings 90 develop excessive heat upon depletion of lubrication in either primary or backup applications, the end of the body of lubricant 78 adjacent the passage 84 begins to melt since it is in closest proximity to the source of the heat. When this occurs, the piston 80 drives the lubricant body 78 to the right to discharge the melted lubricant from the bore 76 and inject such melted lubricant into the bearing assembly 88 through the port 86 in its inner race.

The structure of FIG. 9 is an exemplary backup application illustrating lubricant transfer by mechanical rubbing in conjunction with attainment of a given temperature. A shaft 92 is journaled in a bearing block 94 having an upright passage 96 therein which forms a cavity or reservoir for a body of solid, backup lubricant 98. As long as the primary lubricant is effective, the backup lubricant 98 remains spaced above and out of contact with the surface of the shaft 92 by virtue of the provision of an annular recess 100 which is filled by the bottom of the lubricant body 98. However, if sufficient heat is developed within the journal to cause melting of the binder of the backup lubricant 98, such melting will initially occur in the recess 100 to release the lubricant body 98 for movement downwardly in mass into overlying contact with the shaft 92. The lubricant 98 is then transferred by the rubbing of the shaft 92 thereagainst to distribute the lubricating film throughout the journal.

The bearing configuration shown in FIG. 10 illustrates a particularly useful approach to the lubrication (either primary or backup) of a ball bearing assembly 102 having an annular bearing retainer or cage 104 interposed between the inner race 106 and the outer race 108. The retainer 104 has a plurality of ball pockets 110 therein receiving the respective ball bearings 112. A cylindrical plug 114 of solid lubricant is inserted into a complemental opening in retainer 104 extending in parallelism with the axis of the bearing assembly 102 and communicating with a corresponding ball pocket 110. Two such plugs 114 are disposed in aligned, opposed relationship in association with each ball pocket 110 in order to provide a lubricant supply on both sides of the pocket. Thus, the retainer 104 may be constructed of a metallic material in the usual manner, yet the retainer 104 also carries a supply of solid lubricant for use in either the primary or backup lubrication of each of the ball bearings 112. Being in very close proximity to the ball bearings 112, the lubricant plugs 114 are sensitive to the development of excessive heat indicative of lubricant depletion and, therefore, melt readily and flow into the pockets 110 for distribution in film form on the ball bearings 112.

The solid lubricant formulations utilized in the practice of the present invention will, of course, be dictated largely by the fusion temperature requirement for the lubricant binder. For low temperature applications (melting of the binder at a temperature on the order of 110° F.), 25 percent $MoS_2$ and 25 percent $Sb_2O_3$+percent paraffin binder by weight, and 10 percent $MoS_2$+90 percent paraffin by weight have proven satisfactory. For higher temperatures (a melting temperature on the order of 250° F.), 25 percent $MoS_2$ and 25 percent $Sb_2O_3$ + 50% polyphenyl ether binder by weight, and 10% $MoS_2$ + 90% polyphenyl ether by weight have proven satisfactory.

We claim:

1. A method of lubricating the wear surface of a machine element, the latter having a normal operating temperature and developing excessive heat in the absence of lubrication, said method comprising the steps of:
   providing a reservoir containing a solid lubricant having a lubricating pigment disposed in a fusible binder which melts at a temperature greater than said normal operating temperature;
   positioning said lubricant in heat exchange relationship with said element;
   transferring said lubricant from said reservoir to said wear surface when the binder is heated to the melting temperature thereof in response to the development of excessive heat by said element;
   and thereafter distributing the melted lubricant over said wear surface to form a lubricating film thereon and effect reduction of the temperature of said element to cause resolidification of the binder and adhesion of the film to the wear surface as the element returns to said normal operating temperature.

2. The method as claimed in claim 1, wherein the steps of transferring said lubricant from said reservoir to said wear surface and distributing the melted lubricant thereover are effected by flow of said lubricant upon melting of said binder.

3. A method of lubricating the wear surface of a machine element, the latter having a normal operating temperature and developing excessive heat in the absence of lubrication, said method comprising the steps of:
   providing said element with a primary lubricant on said wear surface;
   providing a reservoir containing a solid, fusible backup lubricant which melts at a temperature greater than said normal operating temperature and indicative of a distress condition preceding ultimate failure of said element;
   positioning said backup lubricant in heat exchange relationship with said element; and
   transferring said backup lubricant from said reservoir to said wear surface when the backup lubricant is heated to the melting temperature thereof in response to the development of excessive heat by said element.

4. The method as claimed in claim 3, wherein the step of transferring said backup lubricant from said reservoir to said wear surface is effected by flow of said backup lubricant upon melting thereof.

5. The method as claimed in claim 3, wherein the step of transferring said backup lubricant from said reservoir to said wear surface is effected by movement of said backup lubricant into rubbing contact with said surface upon melting of said backup lubricant.

6. The method as claimed in claim 3, wherein is provided the additional steps of:
   providing a second reservoir containing a second, solid, fusible backup lubricant which melts at a temperature greater than the melting temperature of the first mentioned backup lubricant;
   positioning said second backup lubricant in heat exchange relationship with said element; and
   transferring said second backup lubricant from said second reservoir to said wear surface when the second backup lubricant is heated to the melting temperature thereof in response to the development of excessive heat by said element.

7. The method as claimed in claim 3, wherein is provided the additional step of:
   providing said backup lubricant with an identifying characteristic capable of detection upon transfer of the backup lubricant from said reservoir to said wear surface.

8. In combination with a machine element provided with a wear surface, said element having a normal operating temperature and developing excessive heat in the absence of lubrication:
   first reservoir means containing a first, solid, fusible lubricant having a melting temperature greater than said normal operating temperature, said reservoir means being disposed with said lubricant in heat exchange relationship with said element for transfer of said lubricant from said reservoir means to said wear surface when the lubricant is heated to the melting temperature thereof in response to the development of excessive heat by said element; and
   second reservoir means containing a second, solid, fusible lubricant having a melting temperature greater than the melting temperature of said first lubricant, said second reservoir means being disposed with said second lubricant in heat exchange relationship with said element for transfer of said second lubricant from said second reservoir means to said wear surface when the second lubricant is heated to the melting temperature thereof in response to the development of excessive heat by said element.

9. A method of lubricating the wear surface of a machine element, the latter having a normal operating temperature and developing excessive heat in the absence of lubrication, said method comprising the steps of:
   providing a reservoir containing a solid lubricant body having a lubricating pigment disposed in a fusible binder which melts at a temperature greater than said normal operating temperature;
   positioning said lubricant body in heat exchange relationship with said element for progressive melting of the body upon application of heat thereto from said element;
   transferring melted lubricant from said reservoir to said wear surface when a portion of said body is heated to the melting temperature of said binder in response to the development of excessive heat by said element;
   distributing the melted lubricant over said wear surface to form a lubricating film thereon and effect reduction of the temperature of said element to cause resolidification of the binder and adhesion of the film to the wear surface as the element returns to said normal operating temperature; and repeating the foregoing steps of transferring and distributing melted lubricant when said film becomes depleted to thereby relubricate the wear surface.